United States Patent [19]

Stock

[11] 4,134,363
[45] Jan. 16, 1979

[54] COW TRAINER WITH DISCONNECT SWITCH

[76] Inventor: Lester A. Stock, Rte. 1, Newton, Wis. 53063

[21] Appl. No.: 757,817

[22] Filed: Jan. 10, 1977

[51] Int. Cl.$^2$ .......................................... A01K 29/00
[52] U.S. Cl. ................................................... 119/27
[58] Field of Search ...................... 119/27, 29; 174/69; 267/69; 339/249 S; 24/DIG. 4

[56] References Cited

U.S. PATENT DOCUMENTS

| | | | |
|---|---|---|---|
| 2,779,309 | 1/1957 | Myer et al. | 119/27 |
| 3,955,535 | 5/1976 | Stock | 119/27 |

Primary Examiner—Russell R. Kinsey
Assistant Examiner—Robert P. Swiatek

Attorney, Agent, or Firm—Joseph P. House, Jr.

[57] ABSTRACT

A cow trainer hung from an electric wire has a disconnect switch between a metallic hanger bracket and a metallic stem or rod which carries the cow contact bar. The switch comprises an insulating sleeve having a bore in which one end of the stem slides. A pair of insulating hanger straps interconnect the sleeve and the stem whereby the weight of the stem and cow contact bar normally pull the straps to a fully extended position in which the end of the stem is in spaced relationship to the hanger bracket and out of electrical contact therewith. The straps yield upwardly when the stem is subject to upward movement when the cow humps her back, thus to permit the stem to slide upwardly in the bore and make electric contact with the hanger bracket and shock the cow.

5 Claims, 4 Drawing Figures

U.S. Patent
Jan. 16, 1979
4,134,363
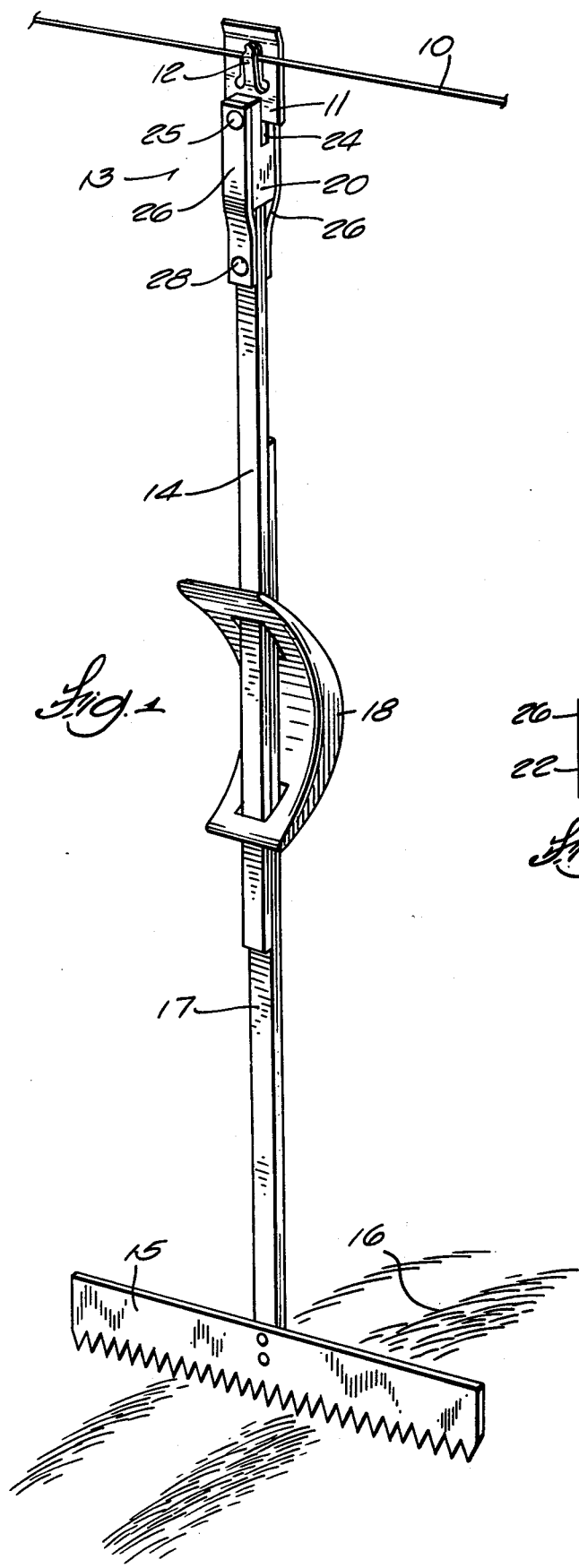
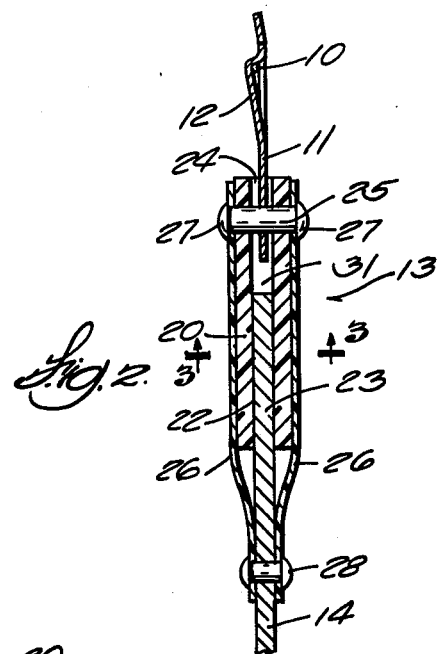
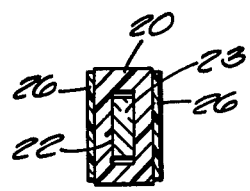
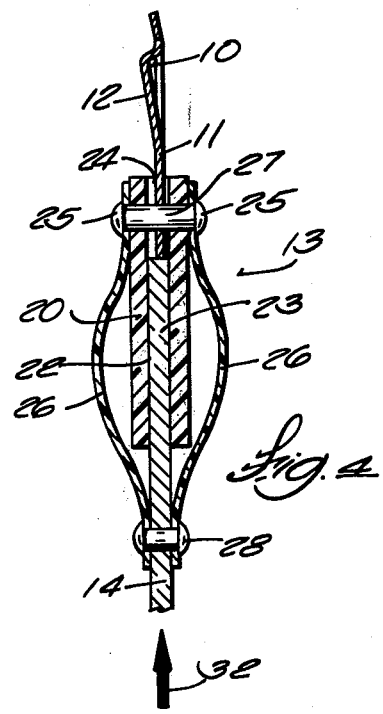

COW TRAINER WITH DISCONNECT SWITCH

BACKGROUND OF THE INVENTION

U.S. Pat. No. 3,955,535 illustrates a cow trainer with a switch which isolates cow trainer parts from the electric wire, except when the cow humps her back, whereupon the cow trainer parts are elevated to close the contacts of the switch and connect the cow trainer parts to the electric wire and to impose an electric shock on the cow. The switch illustrated in said patent is relatively expensive to fabricate and is subject to fouling with dirt, rust and corrosion. Moreover, said switch relies entirely upon gravity to open the switch. Hence it may become unreliable in operation after a prolonged period of use in a cow barn environment.

SUMMARY OF THE INVENTION

In accordance with the present invention, a disconnect switch is provided which is much simpler than the aforementioned switch. Except for the metallic contacts, the switch of the present invention is made entirely of plastic and not as subject to corrosion and rusting of metal parts or clogging with dirt as the aforementioned switch. Moreover, the switch of the present invention does not rely entirely upon gravity to open its contacts. The instant switch is characterized by one or more inherently resilient suspension straps from which the cow contact bar and stem are suspended. When the cow humps her back, the stem is lifted to close the electrical contact. During this movement of the stem, the straps yield resiliently to permit such movement. When upward pressure on the stem is discontinued, the resilience of the straps assists gravity in thrusting the stem downwardly to disengage the electrical contacts.

Other objects, features and advantages of the invention will appear from the disclosure hereof.

DESCRIPTION OF THE DRAWINGS

FIG. 1 is a perspective view of a cow trainer provided with a disconnect switch embodying the present invention.

FIG. 2 is an enlarged vertical cross section taken through the disconnect switch of the cow trainer of FIG. 1. The switch is in open position.

FIG. 3 is a cross section taken along the line 3—3 of FIG. 2.

FIG. 4 is a cross section similar to FIG. 2, but showing the stem displaced upwardly to a position closing the electrical contacts and in which the yieldable straps have bellowed outwardly to permit this movement.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The cow trainer of the present invention performs the same basic functions as well-known prior art cow trainers, such as the one shown in U.S. Pat. No. 3,043,266. In addition, it incorporates a disconnect switch, as in U.S. Pat. No. 3,955,535. However, for the aforestated reasons, the disconnect switch of the present invention is greatly superior to the aforementioned switch.

The cow trainer is suspended from an electric wire 10. For this purpose metal hanger bracket 11 of conventional construction clips onto the wire 10. Hanger bracket 11 has a yieldable tang 12 by which the bracket 11 is releasably clamped to the wire 10.

Immediately below the hanger bracket 11 is a disconnect switch 13 from which the stem or rod 14 of the cow trainer is suspended. Remaining parts of the cow trainer are conventional. In the illustrated embodiment these parts comprise a cow contact bar 15 which is positioned immediately above a cow 16. Extending upwardly from the contact bar 15 is a stem 17 which overlaps and is slidably related to stem 14. The two overlapped portions of the stems 14, 17 extend through a C-shaped spring type clamping bracket 18 of conventional construction. Clamping bracket 18 permits adjustment of the stem portions 14, 17 to adjust the spacing between wire 10 and cow contact bar 15.

The disconnect switch 13 comprises an insulating sleeve or block 20 which is made of a suitable dielectric material such as rigid vinyl. Block 20 has a longitudinal bore 22 into which the upper end portion 23 of stem 14 is telescopically received. Stem 14 and bore 22 are desirably made of complementary non-circular cross sections, for example, rectangular as shown in in the drawings, thus to prevent the stem 14 from twisting in the sleeve 20.

The upper end of the sleeve 20 is provided with a cross slot 24 which intersects bore 22 which receives the lower margin of the metal hanger bracket 11. The sleeve 20 and bracket 11 are pivotally connected on a cross pin or rivet 25 having end heads 27.

The stem 14 is suspended from the sleeve 20 by insulated strap means which in the disclosed embodiment comprises a pair of vinyl or other insulated straps 26, one at each side of the sleeve 20. In preferred embodiments, the sleeve 20 desirably has a rectangular cross section so that it has flat sides against which the straps 26 lie. The upper ends of the straps are retained beneath the heads 27 of the cross pin or rivet 25, thus to anchor the straps to the sleeve 20. The lower ends of the straps 26 are fastened by rivet 28 to the stem 14.

Straps 26 are made of such a length that they are fastened at 28 to the stem 14 at a point on the stem spaced somewhat below the bottom of the sleeve 20. Moreover, this connection is made so that the upper end 23 of the stem 14 is spaced somewhat from the lower edge of the hanger bracket 11, thus leaving a gap 31 (FIG. 2) between these parts. The hanger bracket 11 and the stem 14 are fabricated of metal, so as to be electrically conductive. As aforementioned, the sleeve 20 and straps 26 are made of insulating material so that when the cow trainer is suspended from the electric wire 10 and the cow contact bar 15 is spaced from the cow 16, gravity will pull the cow trainer downwardly and straighten out the straps 26 so that the gap 31 insulates the hanger 11 from the stem 14. In this position of the parts as illustrated in FIGS. 1 and 2, the switch 13 is open and the farmer can handle the metal parts of the cow trainer below the switch 13 without receiving a shock. Thus, the farmer may safely adjust the clamp 18 and the relative positions of the stem portions 14, 17.

When the cow 16 humps her back to evacuate, this action imposes upward pressure on the bar 15 and stems 14, 17, so that the stem 14 slides upwardly in the direction of arrow 32 in FIG. 4 in the bore 22 of the sleeve 20, to the position shown in FIG. 4. As the stem 14 moves upwardly the resiliently yieldable straps 26 will resist only slightly and will bellow outwardly as indicated in FIG. 4 to permit upward movement of the stem 14. In its uppermost position, the upper end 23 of the stem 14 will contact the lower edge of the hanger bracket 11, thus to complete the electrical circuit to wire 10 and impose a shock on the cow for training purposes.

When the cow moves back in her stall, thus to permit the stem 14 to drop by gravity because of the weight of the stem and the cow contact bar 15, the stem 14 will drop to its position shown in FIG. 2 in which the disconnect switch 13 is opened. This breaks the circuit from wire 10 to the stem 14.

The insulated straps 26 are desirably made of vinyl or other resilient material so that when the straps bellow outwardly as shown in FIG. 4, they will yield resiliently and thus store energy. This energy is utilized to exert a downward thrust on stem 14 when the straps straighten out in the course of movement of the stem 14 from its FIG. 4 to its FIG. 2 position. In this manner the resilient straps assist gravity and the weight of the stem and contact bar of the cow trainer to exert a position thrust or force to open the electric contacts. Accordingly, even if the disconnect switch 13 tends to clog up with dirt, there is a positive force tending to open the switch whenever the upward pressure of the cow 16 against the contact bar 15 is relaxed.

Slot 24 in the switch body 20 is deep enough to leave ample room for the sleeve 20 to swing on its pivot 25. Accordingly, the parts of the cow trainer below the hanger 11 can swing laterally without imposing such pressure on the tang 12 of the hanger bar 11 to twist it off the wire 10.

Inasmuch as almost all of the parts of the switch 13, except the electric contacts, are made of plastic, they will be resistant to rust and corrosion. While a single strap 26 would suffice, it is preferred to use two straps, one at each side of the body 20 of the switch, so that the support of the stems 14 and 17 and bar 15 is balanced and the stem 14 will track correctly in the sleeve bore 22.

I claim:

1. In a cow trainer adapted to be hung from an electric wire and comprising a cow control bar, a hanger stem connected to the cow control bar, a hanger bracket adapted for attachment to the electric wire and a disconnect switch between the hanger bracket and stem, the stem and cow control bar hanging by gravity from the disconnect switch, the improvement in which said disconnect switch comprises an insulating sleeve having a bore in which one end of the stem is slidably received, means connecting said insulating sleeve to said hanger bracket with the bracket exposed to said bore to act as an electric contact, and insulating strap means interconnecting the sleeve and stem for support of the stem from the sleeve, to limit separation therebetween and whereby the weight of the stem and cow control bar will normally pull said strap means to a fully extended position supporting the stem in said bore with its end in spaced relation to the hanger bracket and out of electric contact therewith, said strap means being yieldable when subject to upward movement of the stem to permit the stem to slide upwardly in said bore to make electric contact with the hanger bracket.

2. The device of claim 1 in which said insulating strap means comprises two insulating straps respectively disposed at opposite sides of said sleeve.

3. The device of claim 2 in which the said opposite sides of the sleeve are flat.

4. The device of claim 1 in which said strap means comprises material which yields resiliently whereby to store energy and subject the stem to restoring force when the stem has moved upwardly and thereby assist gravity in breaking the electric contact between the hanger bracket and stem when upward force on the stem is discontinued.

5. The device of claim 1 in which the sleeve bore and stem have complementary non-circular cross sections to prevent the stem from twisting in the bore.

* * * * *